United States Patent [19]

Tanaka

[11] Patent Number: 5,754,588
[45] Date of Patent: May 19, 1998

[54] RADIO MODEM

[75] Inventor: Masahiko Tanaka, Tokyo, Japan

[73] Assignee: NEC Corporation, Tokyo, Japan

[21] Appl. No.: 515,464

[22] Filed: Aug. 15, 1995

[30] Foreign Application Priority Data

Aug. 15, 1994 [JP] Japan .................................. 6-211740

[51] Int. Cl.$^6$ .................... H04B 1/38; H04L 5/16
[52] U.S. Cl. .............. 375/222; 375/377; 340/825.72; 364/138
[58] Field of Search ...................... 375/222, 377; 340/825.22, 825.44, 825.72; 364/130, 138; 371/68.2, 71; 379/58, 59; 455/33.1, 54.1, 89, 90, 93, 95, 128, 129

[56] References Cited

FOREIGN PATENT DOCUMENTS

| 2-8251 | 1/1990 | Japan . |
|---|---|---|
| 2 285 558 | 7/1995 | United Kingdom . |
| WO94/29968 | 12/1994 | WIPO . |

*Primary Examiner*—Don N. Vo
*Attorney, Agent, or Firm*—Scully, Scott, Murphy & Presser

[57] ABSTRACT

An infra-interface section 15 in a radio modem has a function of radio interfacing with a plurality of radio lines. An interface section 16, conforming to the PCMCIA standard, connects with a data terminal unit to which this radio modem is to be connected. A memory section 17 stores information transmitted or received by the infra-interface section 15. A display section 14 displays the stored transmit/receive information. A control section 18 controls all these sections. By having transmit/receive information, when data are transmitted or received via radio lines, stored into the memory section 17 and then displayed in the display section 14, the user of the terminal is enabled to recognize, by locking at the display section, the plurality of conditions of transmission/reception on a real time basis without confusing them with one another.

4 Claims, 4 Drawing Sheets

| NO. | CALL ARRIVAL TIME INFORMATION | CALLER INFORMATION | TYPE OF INFRA | STORED DATA INFORMATION | |
|---|---|---|---|---|---|
| | | | | RECEPTION CONDITION | DATA |
| 1 | 1994 6/10 17:10 | 030-1111-123456 | A | GOOD | PRESENCE |
| 2 | 1994 6/10 19:20 | 030-1111-123457 | B | GOOD | PRESENCE |
| 3 | 1994 6/12 17:30 | 030-1111-123458 | C | BAD | ABSENCE |
| ......... | | | | | |
| N | 1994 6/12 23:30 | 030-1111-123499 | C | GOOD | PRESENCE |

FIG.3

RADIO MODEM

BACKGROUND OF THE INVENTION

1. Field of the Invention

The present invention relates to a radio modem for use in radio transmission of data stored in a personal computer, and more particularly to a radio modem enabling the transmission and reception of data over a plurality of radio lines.

2. Description of the Related Art

The spreading use of personal computers in recent years is enhancing the need for data communication using personal computers. Conventionally, data communication of this kind solely uses telephone lines, but the demand for data communication by radio is heightening as personal computers are increasingly reduced in size and made more readily portable. This circumstance has led to proposal of radio modems, one example of which, disclosed in the Gazette of the Japanese Utility Model Laid-open No. 1990-18251, is a wireless modem to be connected by a connector to a computer for data communication by radio with peripheral equipment via an antenna. The modem described in this gazette, in particular, can be directly connected to a computer or the like.

In such radio modems, it is desired that data communication by radio be made compatible with a plurality of radio lines differing in frequency and/or modulation method and/or communication protocol.

SUMMARY OF THE INVENTION

An object of the present invention is to provide an improved radio modem for use in radio communication.

Another object of the present invention is provide a radio modem which -permits real time confirmation of information regarding the transmission and reception of data over a plurality of lines and invites no disturbance of information even when data communication is continuously performed over a plurality of lines.

According to the present invention, there is provided a radio modem equipped with an infra-interface section having a function of radio interfacing with a plurality of radio lines; an interface section, conforming to the PCMCIA standard, for connection with a data terminal unit to which the radio modem is to be connected; a memory section for storing information transmitted or received by the infra-interface section; a display section for displaying the stored transmit/receive information; and a control section for controlling all these sections.

The control section may have a clock function. The control section is provided with an internal storage section for temporarily storing transmit/receive information which has been transmitted or received and the time at which it was transmitted or received. It is so configured as to have various items of information stored in the internal storage section at the time of transmission/reception and to have them stored into the memory section after the completion of transmission/reception. The modem is further so configured that the memory section can store transmission/reception time information, called/calling party information, radio line information, the condition of transmission/reception, and data build-up information regarding the presence or absence of received data, and that the display section can display these items of information in a set on a call-by-call basis.

Upon transmission/reception of data over a radio line, the control section supplies that transmit/receive information to the memory section, which, after storing the transmit/receive information, causes the display section to display the transmit/receive information. Even when transmission/reception has been performed consecutively over a plurality of radio lines, the user at the terminal can recognize the plurality of sets of transmission/reception, distinguished from one another, without confusion by looking at the display section, where the transmit/receive information is displayed on a call-by-call basis.

BRIEF DESCRIPTION OF THE DRAWINGS

These and other objects, features and advantages of the present invention will become more fully apparent from the following detailed description when taken in conjunction with the accompanying drawings, wherein:

FIG. 3 is a diagram illustrating an example of the state of receive information stored in the memory or displayed in the display section of the PC card radio modem according to the present invention.

In the drawings,the same reference numerals denote the same structural elements.

DETAILED DESCRIPTION OF THE PREFERRED EMBODIMENT

Figure 1:
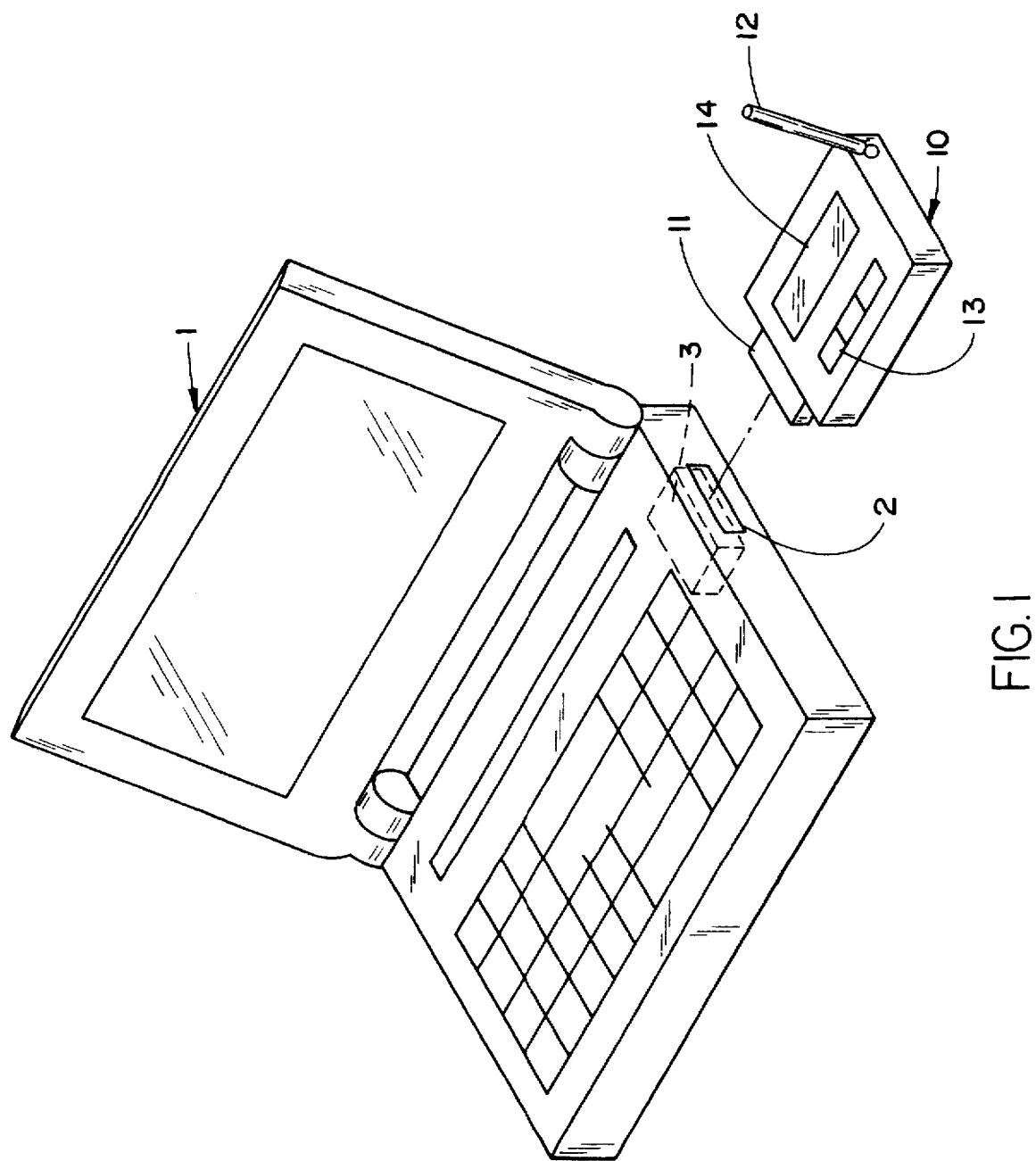
FIG. 1 illustrates an external view of the rough configuration of a personal computer and a PC card radio modem according to the present invention.

Next will be described a preferred embodiment of the present invention with reference to drawings. FIG. 1 illustrates an external view of a typical configuration of a personal computer and a PC card radio modem according to the present invention. On one side of the personal computer 1 is formed a card receptacle groove 2, in which is installed a connector 3 conforming to the PCMCIA interface specifications. A PC card radio modem 10 is formed in a card shape, provided on one side, for instance, with a connector 11 to be engaged with the connector 3 of the personal computer 1 for direct electrical connection and, on the opposite side, with an antenna 12 for radio communication. This PC card radio modem 10 is further equipped with a switching section 3 having various switches and a display section 14 consisting of liquid crystal diodes (LCDs), light emitting diodes (LEDs) or the like.

Figure 2:
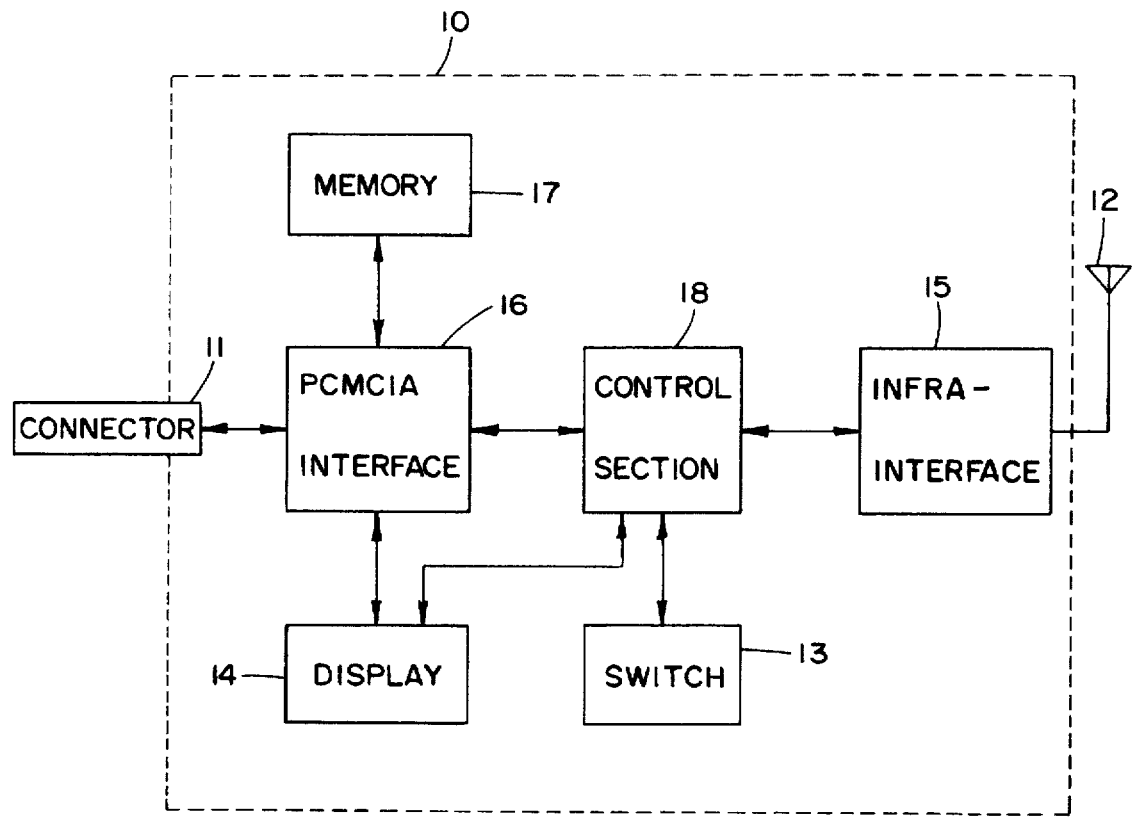
FIG. 2 is a block diagram illustrating the internal configuration of a personal computer and a PC card radio modem, which is a preferred embodiment of the present invention.
Figure 2:
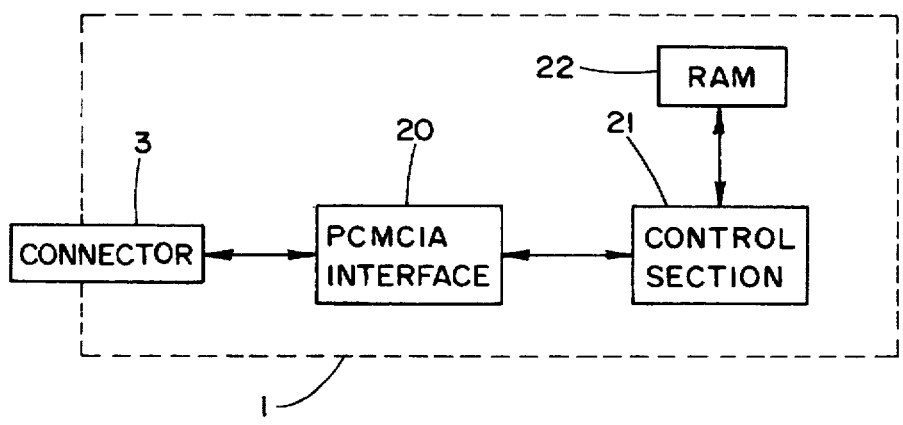

FIG. 2 is a block diagram illustrating the internal configuration of the personal computer 1 and the PC card radio modem 10 shown in FIG. 1. The personal computer 1 has the connector 3, a PCMCIA interface section 20, a control section 21 and a RAM 22. The connector 3 is electrically connected to the connector 11 of the PC card radio modem 10. The PCMCIA interface section 20 enables data communication to be accomplished between the personal computer 1 and the PC card radio modem 10. The control section 21 sends a first set of data, stored in the RAM 22, to the PC card radio modem 10. The control section 21 also stores a second set of data from another unit into the RAM 22 via the PC card radio modem 10.

The personal computer 1 has other constituent elements for its normal functioning as a computer, but their description is dispensed with herein because these elements have no particular relevance to the present invention.

The PC card radio modem 10 is provided with an infra-interface section 15, a PCMCIA interface section 16, a memory section 17 and a control section 18 in addition to the connector 11, the antenna 12, the switching section 13 and the display section 14. The infra-interface section 15, connected to the antenna 12, is configured as an interface section to perform radio modem functions for two or more different types of radio lines. This infra-interface section 15 has functions to convert control signals and data transmitted or received over radio lines into radio signals and baseband signals and to perform format conversion between transmit signals and receive signals.

The PCMCIA interface section 16 is connected to said connector 11 conforming to the PCMCIA specifications, and connects the PC card radio modem 10 to said personal computer 1 via this connector 11. This PCMCIA interface section 16, when the power is turned on and, preferably, when the PC card radio modem 10 is connected to the personal computer 1, performs data exchange for transition into a state of input/output (I/O) operation as a modem between the PC card radio modem and the personal computer 1 in accordance with the operational procedure set forth in the PCMCIA specifications.

The memory section 17 stores information matching the infra-interface section 15. Preferably, the memory section 17 stores the received first and second sets of data and the reception hysteresis at that time as classified by radio line (by the type of infrastructure). For instance, the memory section 17 stores reception hysteresis in a set of call arrival time information, caller information and the type of infrastructure. The memory section 17 also stores, matching this reception hysteresis, data build-up information regarding whether or not data have been normally received and whether or not received data are already stored. P The display section 14 displays reception hysteresis information and the presence or absence of built-up data among others, stored in the memory section 17, in characters, numerals and the like, or by turning light on and off. For instance, reception hysteresis can be displayed in numeral or character information by LCDs or the like, and data build-up information, by two-color LEDs or the like. In the latter case, if a green LED is turned on, it is supposed to mean that data have been normally received and stored into the memory section 17 or, if a red LED is on, it may mean that communication ended abnormally before completion for some reason or other, or that data failed to be received. This functional classification makes possible efficient display.

The control section 18 controls the whole PC card radio modem 10 by controlling its constituent blocks including the infra-interface section 15, PCMCIA interface section 16, memory section 17 and display section 14. The control section 18 is enabled by its clock function to supply call arrival time information to the memory section 17.

Next will be described the operation of the radio modem according to the present invention.

Upon engagement of the connector 11 with the connector 3 of the personal computer 1, the power is turned on, and it is made possible to connect the personal computer 1 to other terminals via radio lines to ready it for radio data communication. For instance, an arriving call on a radio line served by the PC card radio modem 10 is identified by the control section 18 via the infra-interface section 15, and the receive information is supplied via the PCMCIA interface section 16 and the connector 11 to the personal computer 1, which stores receive data, contained in that receive information, into its internal memory or executes prescribed processing on the basis of the receive data.

The control section 18 stores information on the time of the actuation of reception into a temporary storage memory provided in the control section 18 and, if caller information is available from the infra-interface section 15 as additional information, also stores this information together with the time information into the temporary memory in the control section 18. When communication to receive a series of data has been normally completed, the control section 18 supplies the information stored in its temporary memory to the memory section 17, and this information is stored into a storage pattern area for built-up information provided in the memory section 17.

Figure 4:
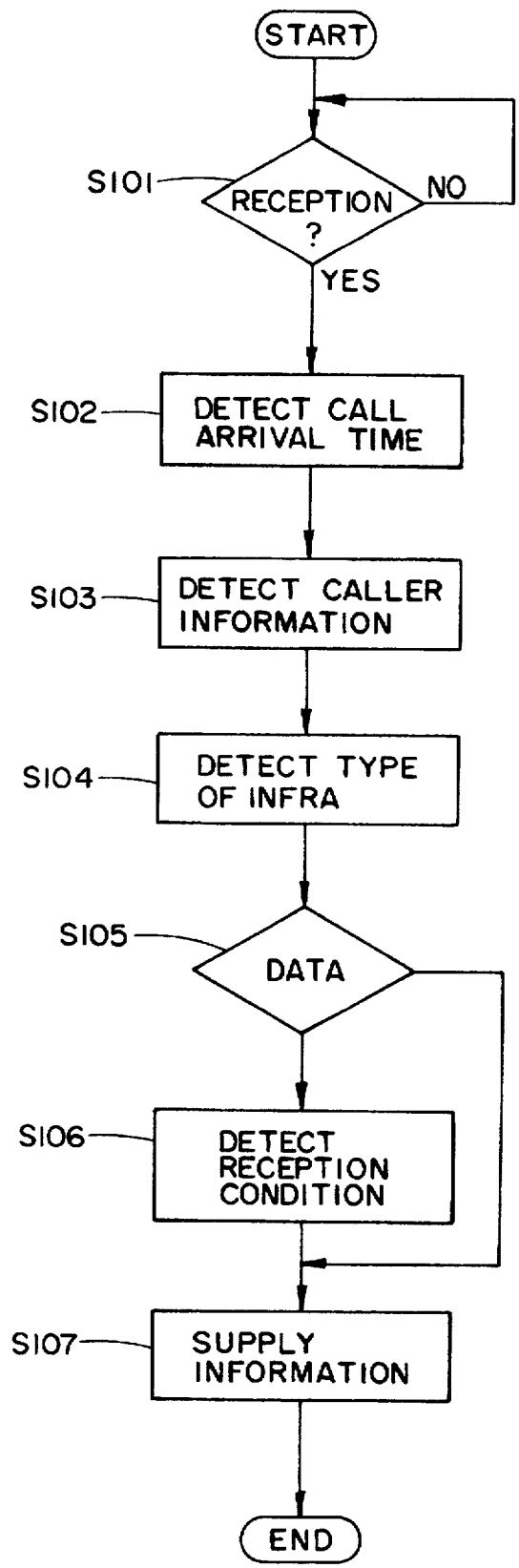
FIG. 4 is a flow-chart illustrating a receiving operation of the control section shown in FIG. 2.

Next will be explained a receiving operation of the control section 18 with reference to FIG. 4.

When a call signal from another unit (not shown) is received (Step S101), call arrival time is detected on the basis of a clock function inside of the control section 18 and call arrival time information is stored into an internal memory (Step S102). Caller information and the type of infra-information, which are inserted in the call signal, are detected and both information are stored, corresponding to the call arrival time information, into the internal memory (Steps S103 and S104). If the data signal is included in the call signal (Step S105), the condition of the reception is detected, for instance, by an error ratio (Step S106). In steps S105 and S106, data information and the reception condition are stored into the internal memory.

When all information are detected, all information stored in the internal memory are transferred to the PCMCIA interface 16 (Step S107) and stored into the memory 17. All information may be displayed on the display 14.

FIG. 3 illustrates a preferable example of the state of storage of such information. In this example, call arrival time information, caller information (e.g., the caller's telephone number), the type of infrastructure (e.g., radio line), the condition of reception, and data build-up information on the presence or absence of data are treated as a set, and each set is assigned an arrival number and stored. The stored information is supplied to the display section 14, which displays the information with LCDs or LEDs as stated above.

In this manner, the user of the personal computer 1, either by operating the PC card radio modem 10 or without having to do any operation, can confirm receive information regarding the received data by looking at the display section 14. Therefore, even when reception has consecutively taken place over a plurality of radio lines, the user can confirm receive information on each radio line, and perceive received data to be entered into the personal computer 1. This arrangement can prevent different sets of received data and the like from being confused with one another, and thereby enable the function for consecutive data communication over a plurality of lines, which the PC card radio modem 10 is provided with, to be effectively performed. Furthermore, upon arrival of a call, receive information can be displayed in the display section on a real time basis, but there is no need to set it at the terminal every time a call arrives, resulting in improved efficiency of information management in data communication.

Although the above-described preferred embodiment is so configured as to store only receive information in the memory section and to display only receive information in the display section, it is also possible to display transmit information at the time of transmission, so that all transmit/receive information can be stored and displayed, enabling radio data communication by a personal computer to be managed efficiently.

Furthermore, although the above-described embodiment has a display section consisting of LCDs and LEDs, this section obviously may be composed of LCDs alone. The display of receive information may cover one set at a time as well as a plurality of sets simultaneously; either option may be chosen according to the capacity of the display section. The display section may either display information only when its actuating button is pressed or unconditionally do so whenever information is received. It may be configured to be capable of displaying other information than the receive information referred to in the above description of the preferred embodiment.

As hitherto described, a radio modem according to the present invention is provided with an infra-interface section having a function of radio interfacing with a plurality of radio lines; an interface section, conforming to the PCMCIA specifications, for connecting this radio modem to a data terminal; a memory section for storing information transmitted or received by the infra-interface section; a display section for displaying the transmit/receive information stored; and a control section for controlling all the other sections. Accordingly, when data are transmitted or received over a radio line, information regarding that transmission/reception is stored in the memory section and displayed in the display section, so that the user of the terminal, only by looking at the display, can perceive a plurality of sets of transmission/reception information without confusing them with one another and on a real time basis even when transmission/reception takes place consecutively over a plurality of radio lines, and improved efficiency of information management in data communication can be achieved as a result.

The control section, besides having a clock function, is provided with an internal storage section for temporarily storing transmit/receive information which has been transmitted or received and the time at which it was transmitted or received. By configuring the control section so as to have various items of information stored in the internal storage section at the time of transmission/reception and to have them stored into the memory section after the completion of transmission/reception, transmit/receive information as well as the time of transmission/reception can be displayed on a real time basis upon completion of transmission reception.

By so configuring the radio modem that the memory section can store transmission/reception time information, called/calling party information, radio line information, the condition of transmission/reception, and data build-up information regarding the presence or absence of received data, and that the display section can display these items of information in a set on a call-by-call basis, the user of the terminal is enable to readily confirm transmit/receive information over a plurality of lines on a call-by-call basis.

While the invention has been described with reference to a specific embodiment thereof, it will be appreciated by those skilled in the art that numerous variations, modifications and embodiments are possible and, accordingly, all such variations, modifications and embodiments are to be regarded as being within the spirit and scope of the invention.

What is claimed is:

1. A radio modem, connected to a data terminal unit, for performing data communication with other terminal units over radio lines, said radio modem comprising:

an infra-interface means for interfacing with a plurality of radio lines;

an interface means, conforming to a PCMCIA standard, for connecting with said data terminal unit;

a memory means for storing information transmitted or received by said infra-interface means; and a control means for controlling said infra-interface means, said interface means and said memory means, said control means comprising:

a clock function;

an internal storage means for temporarily storing transmit/receive information which has been transmitted or received and the time at which it was transmitted or received, said transmit/receive information being stored in said internal storage means at the time of transmission/reception and said transmit/receive information being stored into said memory means after the completion of transmission/reception.

2. A radio modem, as claimed in claim 1, wherein said memory means stores transmission/reception time information, called/calling party information, radio line information, the condition of transmission/reception, and data build-up information regarding the presence or absence of received data.

3. A radio modem, as claimed in claim 2, further comprising a display means for displaying the transmit/receive information stored in said memory means.

4. A radio modem, as claimed in claim 3, wherein said display means displays various information in a set on a call-by-call basis.

* * * * *

UNITED STATES PATENT AND TRADEMARK OFFICE
CERTIFICATE OF CORRECTION

PATENT NO. : 5,754,588
DATED : May 19, 1998
INVENTOR(S): Masahiko Tanaka

It is certified that error appears in the above-identified patent and that said Letters Patent is hereby corrected as shown below:

On The Title Page, after section [58]: Insert the following:

--References Cited

U.S. PATENT DOCUMENTS 5,302,947 4/94 Fuller et al 5,343,319 8/94 Moore 5,418,524 5/95 Fennell 5,550,738 8/96 Bailey et al--

Column 1, Line 35: "which-permits" should read --which permits--

Column 3, Line 34: Delete "P" and "The display..." should begin new paragraph.

Signed and Sealed this

Twenty-eighth Day of November, 2000

Attest:

Q. TODD DICKINSON

*Attesting Officer*   *Director of Patents and Trademarks*